(12) United States Patent
Lamvik

(10) Patent No.: US 6,520,649 B1
(45) Date of Patent: Feb. 18, 2003

(54) IMAGE PROJECTION DEVICE AND ASSOCIATED METHOD

(75) Inventor: Michael K. Lamvik, Carrboro, NC (US)

(73) Assignee: MCNC, Research Triangle Park, NC (US)

(*) Notice: Subject to any disclaimer, the term of this patent is extended or adjusted under 35 U.S.C. 154(b) by 0 days.

(21) Appl. No.: 10/041,861

(22) Filed: Jan. 7, 2002

(51) Int. Cl.[7] .................. G03B 21/26; G03B 21/00
(52) U.S. Cl. ............................. 353/94; 353/31
(58) Field of Search ............... 353/48, 122, 7, 353/31, 94, 82; 348/758, 757, 780, 804

(56) References Cited

U.S. PATENT DOCUMENTS

| | | | |
|---|---|---|---|
| 4,139,261 A | * | 2/1979 | Hilsum ............... 313/494 |
| 4,299,447 A | | 11/1981 | Soltan et al. |
| 4,734,779 A | | 3/1988 | Levis et al. |
| 4,761,641 A | | 8/1988 | Schreiber |
| 5,012,274 A | | 4/1991 | Dolgoff |
| 5,129,028 A | | 7/1992 | Soltan |
| 5,150,445 A | | 9/1992 | Toyoda et al. |
| 5,465,315 A | | 11/1995 | Sakai et al. |
| 5,502,457 A | | 3/1996 | Sakai et al. |
| 5,822,002 A | | 10/1998 | Tokoro et al. |
| 5,847,784 A | | 12/1998 | Finnila et al. |
| 5,902,030 A | * | 5/1999 | Blanchard ........... 353/30 |
| 5,956,000 A | | 9/1999 | Kreitman et al. |
| 5,974,215 A | | 10/1999 | Bilbro et al. |
| 5,988,817 A | * | 11/1999 | Mizushima et al. ... 352/133 |
| 6,128,131 A | | 10/2000 | Tang |
| 6,219,011 B1 | | 4/2001 | Aloni et al. |
| 6,219,099 B1 | | 4/2001 | Johnson et al. |
| 6,222,593 B1 | * | 4/2001 | Higurashi et al. ..... 315/368.12 |

OTHER PUBLICATIONS

Dolgoff, Eugene, "Optical Depixelization for Electronic Image Projection", SPIE, 1992, pp. 160–171, vol. 1664.

Weiss, Richard J., "Fiber–optic Tapers Offer High–Quality Image Transmission", SPIE, 2000, http://www.spie.org/web/oer/february/feb97/research.html.

* cited by examiner

Primary Examiner—Russell Adams
Assistant Examiner—Andrew Sever
(74) Attorney, Agent, or Firm—Alston & Bird LLP

(57) ABSTRACT

An image projection device adapted to project an image on a remotely disposed display is provided. The image projection device comprises a plurality of image elements, each image element being configured to emit an image portion therefrom. The image portions are directed through a projection lens, configured to cooperate with the image elements, and projected onto the remote display. A plurality of fiber-optic elements, corresponding to the plurality of image elements, is disposed between the image elements and the projection lens. Each fiber-optic element is configured to have a light-emitting end, toward the projection lens, tapering to a light-receiving end toward the corresponding image element. The fiber-optic element is thereby configured to receive the image portion from the image element at the light-receiving end and to expand the image portion before emitting the expanded image portion from the light-emitting end. The light-emitting ends of the fiber-optic elements are contiguously arranged so as to combine the image portions into a contiguous display image, wherein the contiguous display image is then directed through the projection lens so as to be projected onto the remote display. An associated method is also provided.

19 Claims, 3 Drawing Sheets

IMAGE PROJECTION DEVICE AND ASSOCIATED METHOD

FEDERALLY SPONSORED RESEARCH OR DEVELOPMENT

The invention received funding from the United States Army under Grant No. DAAD 19-00-2-0003.

FIELD OF THE INVENTION

The present invention relates to image projection devices and, more particularly, to an image projection device and an associated method for implementing an array of tapered fiber-optic elements coupled to a corresponding array of image elements, each image element emitting a portion of a source image, so as to expand the source image portions and to produce a single contiguous high-resolution display image for projection onto a remote screen.

BACKGROUND OF THE INVENTION

Projectors are typically used in situations where a large visual display is necessary for disseminating information to a number of viewers, for example, during lectures in a classroom, symposiums in an auditorium, or presentations in a boardroom. However, one shortcoming of projecting a greatly enlarged display image onto a remote screen is a loss of resolution as compared to the source image. Accordingly, there have been a number of proposed solutions for increasing the resolution of a projected display image. One such approach involves implementing a plurality of projectors, with each projector being configured to project a portion of an overall image. The projectors are then arranged such that the projected sub-images can be combined or tiled to form the overall image on a distant projection screen. However, such a system may often be undesirably large due to the number of required projectors. In addition, the set-up of such a system may be very complex, requiring, for example, keystone correction; image shifting, rotation, and/or distortion; edge feathering; and/or intensity or color adjustments. In addition, the configuration of each projector may, in some instances, produce an undesirable pixellation effect in the projected image which may be detrimental to the image resolution.

Thus, there exists a need for an image projection device capable of projecting a contiguous high-resolution image onto a remote display. Such a device should also be operable to produce the high-resolution image without requiring extensive or complicated set-up procedures. Embodiments of an image projection device according to the present invention should also have a compact size and relatively simple construction so as to facilitate, for example, packaging and deployment considerations as well as durability and reliability.

SUMMARY OF THE INVENTION

The above and other needs are met by the present invention which, in one embodiment, provides an image projection device adapted to project an image on a display disposed remotely therefrom. The image projection device comprises a plurality of image elements, wherein each image element is configured to emit an image portion therefrom. A projection lens is configured to cooperate with the image elements, whereby the image portions are directed through the projection lens and projected onto the remote display. A plurality of fiber-optic elements, corresponding to the plurality of image elements, is disposed between the image elements and the projection lens, wherein each fiber-optic element is configured to have a light-emitting end toward the projection lens. The light-emitting end also tapers to a light-receiving end toward the corresponding image element. The fiber-optic element is thereby configured to receive the image portion from the image element at the light-receiving end and to expand the image portion before emitting the expanded image portion from the light-emitting end. The light-emitting ends of the fiber-optic elements are contiguously arranged so as to combine the image portions into a contiguous coherent display image, wherein the display image is then directed through the projection lens so as to be projected onto the remote display.

Another advantageous aspect of the present invention comprises a method of projecting an image on a display. First, a plurality of image portions is emitted from a corresponding plurality of image elements. Each image portion is then directed into a light-receiving end of a corresponding fiber-optic element, wherein the fiber-optic element has a light-emitting end opposing and tapering toward the light-emitting end. The fiber-optic element is further configured to expand the image portion between the light-receiving end and the light-emitting end. The expanded image portion is thereafter emitted from the light-emitting end of the fiber-optic element and toward a projection lens, wherein the light-emitting ends of the fiber-optic elements are contiguously arranged so as to combine the expanded image portions into a contiguous coherent display image. The display image is then directed through the projection lens so as to project the display image onto the remote display.

Thus, embodiments of the present invention provide an image projection device implementing an array of tapered fiber-optic elements coupled to a corresponding array of image elements, each image element emitting a portion of a source image. The tapered fiber optic elements are configured to expand the source image portions and to produce a single coherent high-resolution display image for projection onto a remote screen. Embodiments of the present invention thereby provide an image projection device capable of projecting a contiguous coherent high-resolution image onto a remote display without requiring extensive or complicated set-up procedures. Such an image projection device according to the present invention may be configured to have a compact size and comprises relatively simple construction, thereby facilitating, for example, packaging and deployment considerations as well as durability and reliability

BRIEF DESCRIPTION OF THE DRAWINGS

Figure 1:
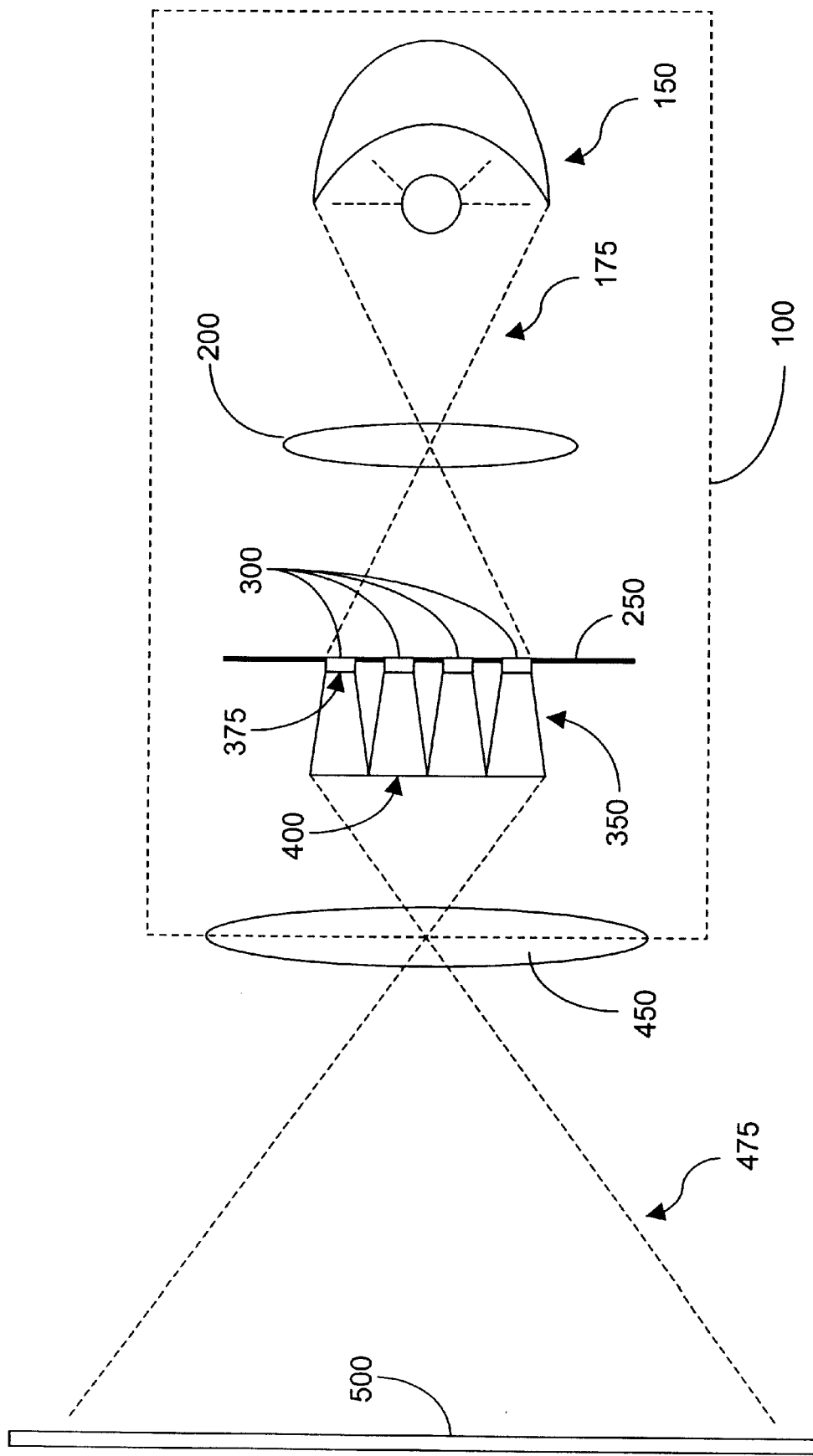

Having thus described the invention in general terms, reference will now be made to the accompanying drawings, which are not necessarily drawn to scale, and wherein:

FIG. 1 is a schematic representation of an image projection device according to one embodiment of the present invention.

Figure 2:
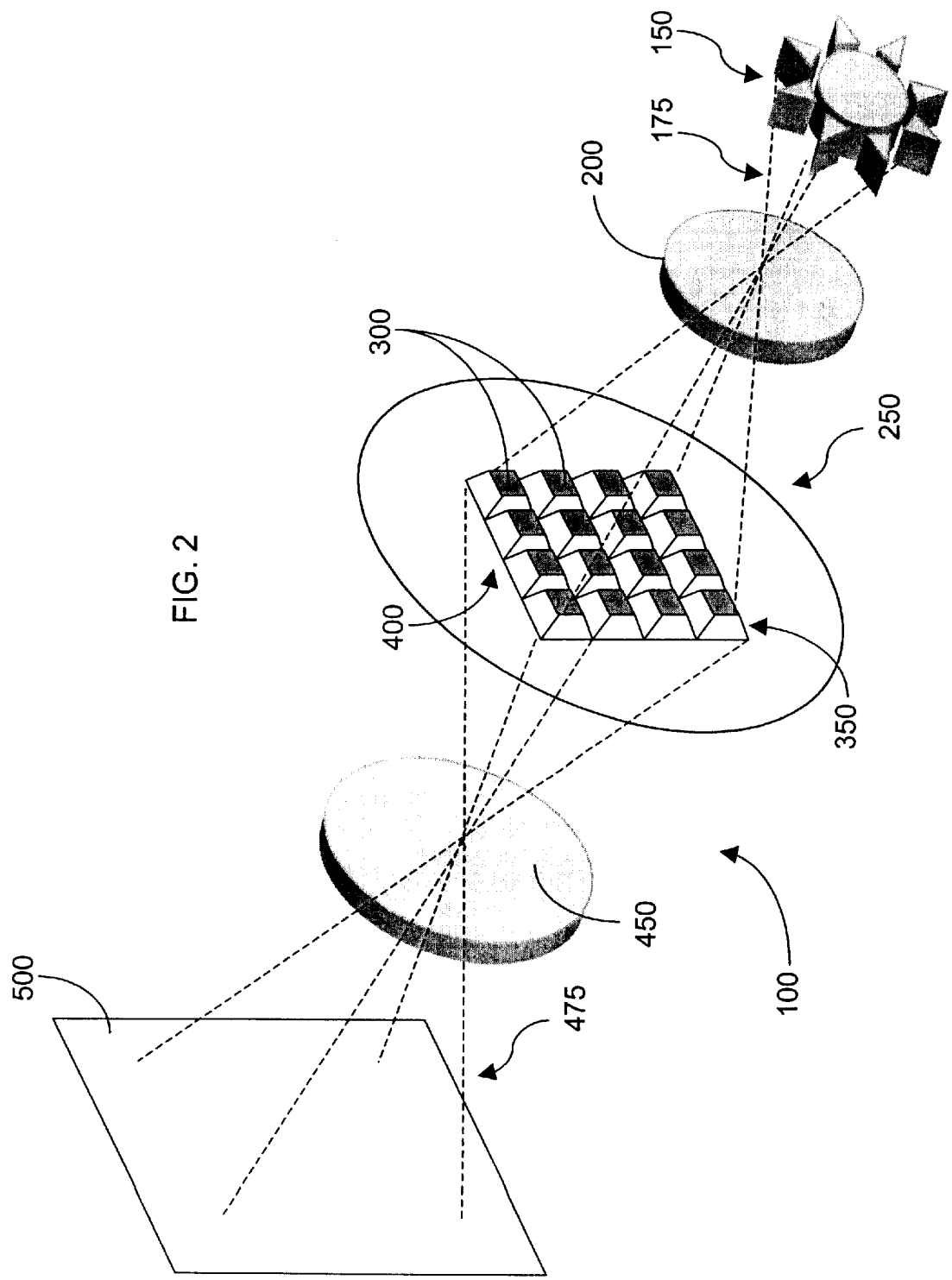

FIG. 2 is a perspective schematic representation of an image projection device according to one embodiment of the present invention.

Figure 3:
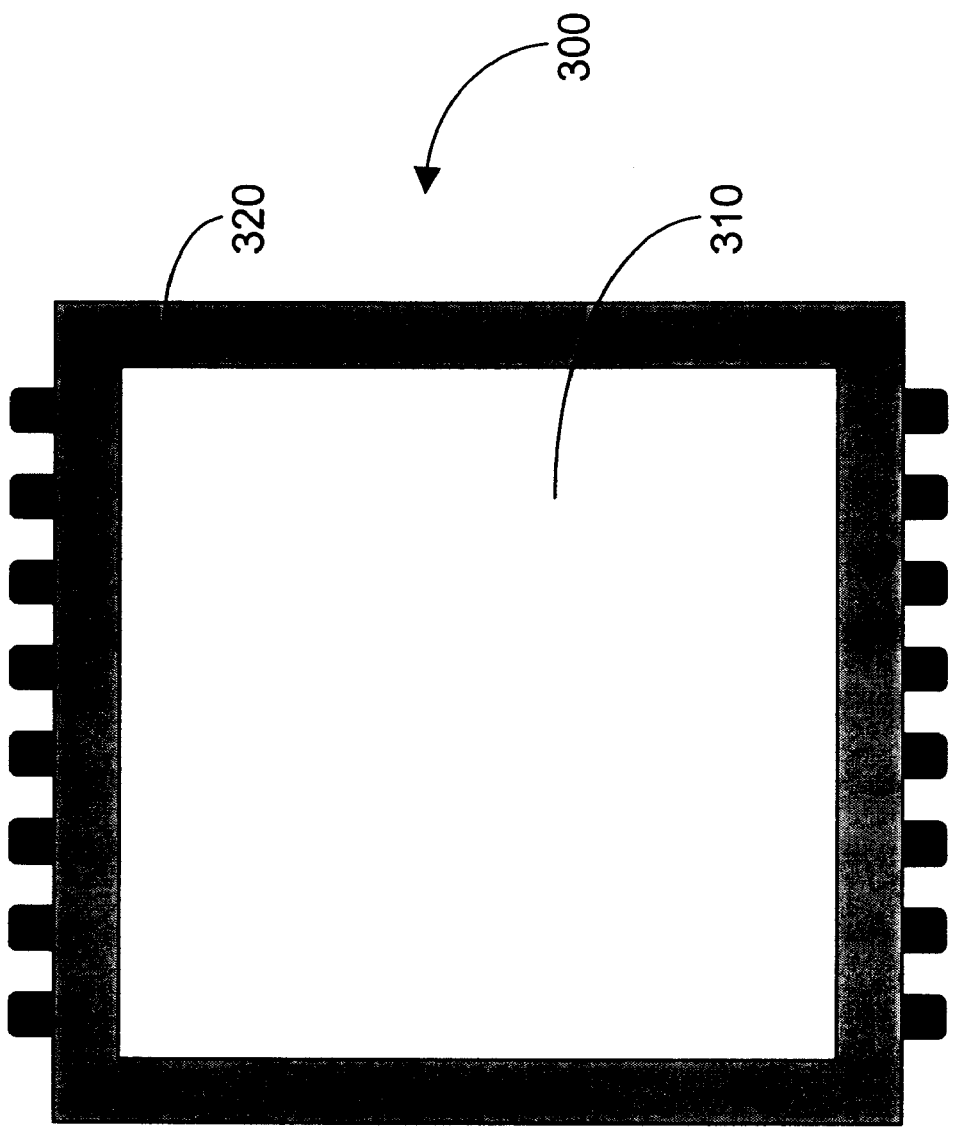

FIG. 3 is a schematic representation of a display chip according to one embodiment of the present invention.

DETAILED DESCRIPTION OF THE INVENTION

The present invention now will be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIGS. 1 and 2 illustrates an image projection device according to one embodiment of the present invention, the image projection device being indicated generally by the numeral 100. Such a device 100 comprises a light source 150 emitting light 175 which is directed through a condenser 200. The term "condenser" as used herein is intended to encompass many different apparatuses and methods for condensing the light 175 such as, for example, a simple condenser lens, a microlens array, integrating rods, reflectors, and other devices as will be appreciated by one skilled in the art. From the condenser 200, the light 175 is directed through a mask 250 and then into one or more display chips 300. In one embodiment, the one or more display chips 300 are arranged in an array. Further, each display chip 300 is configured to display at least a portion of a source image such that, upon the light 175 being directed through the respective display chip 300, a corresponding projection image portion is formed.

The projection image portion produced by the display chip 300 is then directed into a corresponding fiber optic taper 350, each taper 350 having a narrow end 375 operably engaged with the respective display chip 300 and into which the projection image portion is directed. In one embodiment, the display chip 300 is bonded or otherwise joined to the narrow end 375 of the corresponding taper 300. Each taper 350 expands from the narrow end 375 to an opposed wide end 400, the taper 350 thereby being configured to expand the projection image portion directed therethrough from the narrow end 375 to the wide end 400. In one embodiment, the tapers 350, corresponding to the one or more display chips 300, are arranged in a contiguous array. Further, when arranged in the array, the wide ends 400 of the tapers 350 are first cut and polished and then aligned or registered to form the array. The wide ends 400 are then bonded or otherwise joined so as to form the single contiguous array. According to a particularly advantageous embodiment of the present invention, the wide ends 400 of the tapers 350 are bonded or otherwise joined such that the projection image portions directed through the tapers 350 cooperate to form a single contiguous coherent image 425 at the wide ends 400, wherein the image 425 is preferably smooth, even, and seamless. For example, the wide ends 400 may be bonded together using an adhesive having a core index of refraction similar to the tapers 350, or the tapers 350 may be connected together by a fusing process.

Note that, though the fiber optic tapers 350 are generally referred to and illustrated herein, other fiber optic couplers having the same or similar function may also be implemented. For example, curved parallel fiber bundles may facilitate wider spacing of the display chips 300 within the corresponding array, wherein each fiber 350 within such a bundle may also have a narrow end 375 expanding to a wide end 400, similar to the tapers 350 and for magnifying the respective projection image portion, as previously described. Alternatively, each fiber 350 within such a bundle may be configured to be non-magnifying (no taper), wherein such fibers 350 would be joined in register, at the ends thereof opposing the display chips 300, to form a contiguous array for causing the projection image portions directed therethrough to form a single contiguous coherent and seamless image 425. In either instance, the single contiguous image 425 is then directed through a projection lens 450 and projected onto a screen 500 disposed remotely with respect to the image projection device 100. However, one skilled in the art will also appreciate that other apparatuses and methods may be implemented when projecting the image 425 from the tapers 350 onto the remote screen 500. For example, the output from the tapers 350 may be bonded to a prism configured to combine images of different colors or a beamsplitting prism may be implemented in order to provide a reflective projection configuration.

As will be further understood and appreciated by one skilled in the art, the display chip 300 may comprise, for example, a liquid crystal display (LCD) display chip, configured to be either transmissive or reflective, having the associated driving electronics and packaging (not shown) necessary to accomplish the appropriate imaging capabilities as described herein. However, the display chip 300 may also comprise emissive displays such as, for example, electroluminescent, light-emitting diode (LED), or organic light-emitting diode (OLED) displays, wherein the image portion is emitted directly from the emissive display into the corresponding taper 350. Generally, such display chips 300, as schematically shown in FIG. 3, change in reflectivity according to a voltage applied thereto, wherein the voltage applied to various portions of the image producing area 310 of the display chip 300 is selectively controlled so as to produce the desired projection image portion.

In instances where the display chip 300 comprises a transmissive LCD, as shown in FIGS. 1 and 2, light 175 is emitted from a light source 150 and directed through the display chips 300 into the corresponding tapers 350. In other instances, the light source 150 may be integrated with the transmissive LCD so as to form a pseudo-emissive display chip 300, wherein the light is emitted essentially directly from the LCD. In still other instances, the display chip 300 may comprise a reflective LCD or other reflective display such as, for example, a digital mirror. In such instances, illumination light is directed into the wide end 400 of the tapers 350 and then reflected from the display chip 300 disposed at the narrow ends 375 so as to be directed back through the wide ends 400. The reflected light is then projected through, for example, a beam splitter for separating the illumination light from the reflected light. However, in any of these instances, the display chips 300, as shown in FIG. 3, generally comprise electronic components and/or other electronic or mechanical items in a margin 320 surrounding the image producing area 310, wherein it is typically not desirable for the margin 320 to be included the projection image portion.

According to advantageous embodiments of the present invention, the projection device 100 is configured such that the light projected through or from the displays chips 300 and into the tapers 350 is not affected by the margin 320 of the respective display chip 300. That is, the projection device 100 is preferably configured such that the projection image portions exiting the wide ends 400 of the tapers 350 do not include any indication of the margin 320 of the respective display chip 300, or other components. However, the projection device 100 is also preferably configured to not excise any part of the projection image portions emitted from the image-producing portion 310 of the respective display chip 300. In order to implement such a configuration, in instances where a transmissive display chip 300 is used, the mask 250 is disposed between the light source 150 and the display chips 300. In such instances, the mask 250 may comprise, for example, a metal sheet having a reflective side facing the light source 150. The mask 250 is also configured to define a plurality of apertures corresponding to the shape, position, and spacing of the display chips 300. More particularly, the apertures are generally sized and positioned such that the light 175 from the light source 150 passing through each aperture is only directed through the image producing portion 310 of the respective display chip 300. Accordingly, the margins. 320 of the display chips 300 are not illuminated and any excess light is reflected back to the light source 150. In this manner, scattered light is minimized since no light reflects from the margins 320 of the display chips 300 and thus the projection image portion emitted from the respective display chip 300 into the corresponding taper 350 is undisturbed.

For reflective displays and, in some instances, emissive displays, the mask 250 may comprise, for example, a light-absorbing material filling any space between the image-producing portions of adjacent display chips 300 so that light does not reflect from the margins 320 or other structures. However, where the tapers 350 are bonded or joined directly to the image producing portions 310 of the display chips 300, light leakage should be minimal, though it remains preferable to implement a light-absorbing mask 250 to minimize the amount of scattered light. Thus, in light of the similar requirements of transmissive, reflective, and emissive configurations of a projection device 100 according to embodiments of the present invention, the tapers 350 are configured according to several factors including, for example, the size and shape of the image producing portion 310 of the display chip 300, the configuration of the margin 320 thereof, and various pixel resolution factors.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An image projection device adapted to project an image on a display disposed remotely therefrom, the image projection device comprising:

a plurality of image elements, each image element being configured to emit an image portion therefrom;

a projection lens configured to cooperate with the image elements whereby the image portions are directed through the projection lens and projected onto the remote display; and a plurality of fiber-optic elements corresponding to the plurality of image elements and disposed between the image elements and the projection lens, each fiber-optic element being configured to have a light-emitting end toward the projection lens, each light-emitting end tapering to a light-receiving end toward the corresponding image element, the fiber-optic element thereby being configured to receive the image portion from the image element at the light-receiving end and to expand the image portion before emitting the expanded image portion from the light-emitting end, the light-emitting ends of the fiber-optic elements being contiguously arranged so as to combine the image portions into a contiguous coherent display image, the display image being directed through the projection lens so as to be projected onto the remote display.

2. An image projection device according to claim 1 wherein each of the image elements further comprises a liquid crystal display (LCD) device.

3. An image projection device according to claim 2 further comprising a light source configured to emit light through each of the LCD devices so as to form the respective image portions.

4. An image projection device according to claim 1 wherein the image elements are arranged in an array.

5. An image projection device according to claim 4 wherein the light-receiving ends of the fiber-optic elements are arranged in an array corresponding to the array of image elements.

6. An image projection device according to claim 1 wherein the light-emitting ends are arranged in a contiguous array.

7. An image projection device according to claim 1 further comprising an image sectioning device configured to divide a source image into image portions, each image portion being directed to the corresponding image element.

8. An image projection device according to claim 7 wherein at least one of the projection lens and the fiber-optic elements is configured such that the display image is larger than the source image.

9. An image projection device according to claim 1 wherein the projection lens is configured to be non-diffusing.

10. A method of projecting an image on a display, said method comprising:

emitting a plurality of image portions from a corresponding plurality of image elements;

directing each image portion into a light-receiving end of a corresponding fiber-optic element, the fiber-optic element having a light-emitting end opposing and tapering toward the light-emitting end, the fiber-optic element being further configured to expand the image portion between the light-receiving end and the light-emitting end;

emitting the expanded image portion from the light-emitting end of the fiber-optic element and toward a projection lens, the light-emitting ends of the fiberoptic elements being contiguously arranged so as to combine the expanded image portions into a contiguous coherent display image; and directing the display image through the projection lens so as to project the display image onto the remote display.

11. A method according to claim 10 wherein emitting a plurality of image portions further comprises emitting a plurality of image portion from a corresponding plurality of liquid crystal display (LCD) devices.

12. A method according to claim 11 further comprising directing light from a light source through each of the LCD devices so as to form the respective image portions.

13. A method according to claim 10 wherein emitting a plurality of image portions further comprises emitting a plurality of image portion from a corresponding plurality of image elements arranged in an array.

14. A method according to claim 13 wherein directing each image portion into a light-receiving end of a corresponding fiber-optic element further comprises directing the image portions into light-receiving ends of corresponding fiber-optic elements arranged in an array corresponding to the array of image elements.

15. A method according to claim 10 wherein emitting the expanded image portion from the light-emitting end of the fiber-optic element further comprises emitting the expanded image portions from the light-emitting ends of the fiber-optic elements arranged in a contiguous array.

16. A method according to claim 10 wherein directing the display image through the projection lens further comprises directing the display image through the projection lens so as to expand the display image for projection onto the remote display.

17. A method according to claim 10 further comprising dividing a source image into image portions prior to emitting the image portions from the image elements.

18. A method according to claim 17 further comprising directing each image portion to the corresponding image element after dividing the source image and prior to emitting the image portions from the image elements.

19. A method according to claim 10 wherein directing the display image through the projection lens further comprises directing the display image through the projection lens without diffusing the display image.

* * * * *